US009933524B2

(12) United States Patent
Hammes et al.

(10) Patent No.: US 9,933,524 B2
(45) Date of Patent: Apr. 3, 2018

(54) SATELLITE-BASED POSITION DETERMINATION

(71) Applicant: Intel Mobile Communications GmbH, Neubiberg (DE)

(72) Inventors: Markus Hammes, Dinslaken (DE); Andreas Schmid, The Hague (NL)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 0 days.

(21) Appl. No.: 14/639,179

(22) Filed: Mar. 5, 2015

(65) Prior Publication Data

US 2015/0276933 A1 Oct. 1, 2015

Related U.S. Application Data

(63) Continuation of application No. 12/869,726, filed on Aug. 26, 2010, now Pat. No. 8,988,282.

(51) Int. Cl.
| | | |
|---|---|---|
| G01S 19/05 | (2010.01) | |
| G01S 19/25 | (2010.01) | |
| G01S 19/46 | (2010.01) | |
| G01S 19/02 | (2010.01) | |
| G01S 19/24 | (2010.01) | |
| G01S 19/26 | (2010.01) | |
| G01S 19/03 | (2010.01) | |
| G01S 19/13 | (2010.01) | |
| H04W 4/02 | (2009.01) | |
| G01S 5/02 | (2010.01) | |
| H04W 84/12 | (2009.01) | |

(52) U.S. Cl.
CPC ............ *G01S 19/05* (2013.01); *G01S 5/0263* (2013.01); *G01S 19/03* (2013.01); *G01S 19/13* (2013.01); *G01S 19/24* (2013.01); *G01S 19/25* (2013.01); *G01S 19/256* (2013.01); *G01S 19/26* (2013.01); *G01S 19/46* (2013.01); *H04W 4/025* (2013.01); *H04W 84/12* (2013.01)

(58) Field of Classification Search
CPC ........ G01S 5/0263; G01S 19/46; G01S 19/26; G01S 19/256; G01S 19/25; G01S 19/254; G01S 19/05; G01S 19/12
See application file for complete search history.

(56) References Cited

U.S. PATENT DOCUMENTS

| | | | | |
|---|---|---|---|---|
| 5,663,734 A | * | 9/1997 | Krasner | G01S 5/0027 342/352 |
| 6,313,786 B1 | * | 11/2001 | Sheynblat | G01C 21/206 342/357.23 |
| 7,257,417 B1 | * | 8/2007 | Krasner | G01P 3/50 342/357.68 |
| 2005/0064877 A1 | * | 3/2005 | Gum | G01S 5/0252 455/456.1 |
| 2007/0049295 A1 | * | 3/2007 | Soliman | G01S 5/0252 455/456.3 |
| 2009/0189810 A1 | * | 7/2009 | Murray | G01S 19/48 342/357.31 |

(Continued)

*Primary Examiner* — Cassi J Galt
(74) *Attorney, Agent, or Firm* — Viering, Jentschura & Partner mbB

(57) ABSTRACT

Method and apparatuses involving satellite position signals are disclosed. Based on data indicating a usage environment, parameters, for example acquisition parameters or calculation parameters, are adapted.

35 Claims, 2 Drawing Sheets

(56) References Cited

U.S. PATENT DOCUMENTS

2010/0062800 A1* 3/2010 Gupta ............... H04W 72/1215
455/552.1
2010/0178934 A1* 7/2010 Moeglein ................ G01S 19/12
455/456.1

* cited by examiner

SATELLITE-BASED POSITION DETERMINATION

CROSS-REFERENCE TO RELATED APPLICATIONS

This application is a continuation of U.S. patent application Ser. No. 12/869,726, filed Aug. 26, 2010, the contents of the application is incorporated herein by reference in its entirety for all purposes.

BACKGROUND OF THE INVENTION

The present application relates to apparatuses and methods for satellite-based position determination.

Satellite-based position determining apparatuses are nowadays incorporated in a variety of different devices. For example, navigation systems, mobile phones or also some digital cameras have satellite-based position determining apparatuses incorporated to enable a determination of their position. The most commonly used satellite navigation system is GPS (Global Positioning System) provided by the USA. Other satellite navigation systems are GLONASS provided by Russia, the Galileo System currently under development by the European Community or COMPASS provided by China.

Such satellite-based position determining apparatuses may be operated under different conditions. For example, when used for navigation in a car, velocities are frequently about 100 km/h and may even reach over 200 km/h, which necessitates a corresponding update rate of the position to provide the required accuracy. On the other hand, in such outdoor uses the signal strength is comparatively high, but may still vary depending on whether the navigation occurs within a city or in open country. On the other hand, when a pedestrian uses a satellite-based position determining apparatus indoors, the speed involved is considerably slower (only some km/h), but the signal strength is usually lower.

Sometimes, a single satellite position determining apparatus may be used for both of the above-mentioned usages. For example, a GPS receiver in a mobile phone may be used both for car navigation (for example by using an appropriate holder) and indoors. Therefore, in some cases, the performance of such an apparatus may not be at the optimum for both kinds of usage.

DETAILED DESCRIPTION OF THE DRAWINGS

Figure 1:
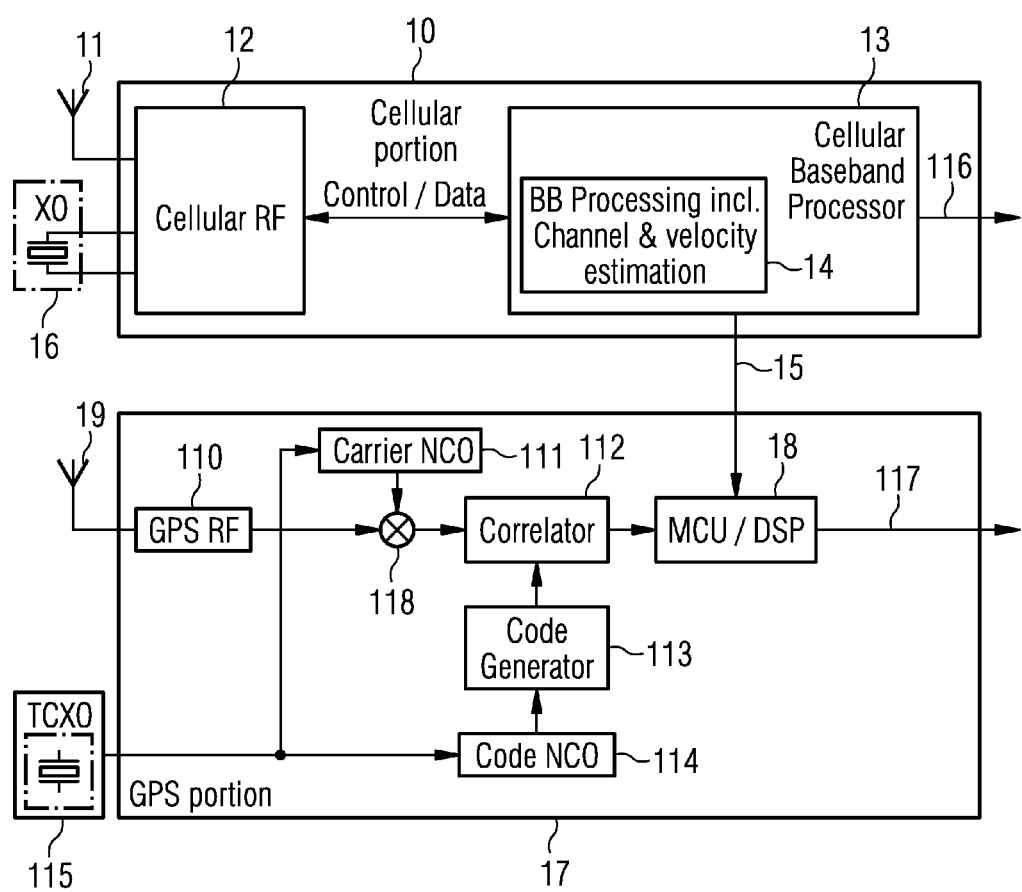
FIG. 1 shows a block diagram of an apparatus according to an embodiment.

In the following, some embodiments of the present invention will be described in detail. It is to be understood that the following description is given only for the purpose of illustration and is not to be taken in a limiting sense. The scope of the invention is not intended to be limited by the embodiment described hereinafter with reference to the accompanying drawings.

It is also to be understood that in the following description of embodiments any direct connection or coupling between functional blocks, devices, components, circuit elements, or other physical or functional units shown in the drawings or described herein could also be implemented by an indirect connection or coupling, i.e. a connection or coupling comprising one or more intervening elements. Furthermore, it should be appreciated that functional blocks or units shown in the drawings may be implemented as separate circuits in some embodiments, but may also be fully or partially implemented in a common circuit in other embodiments. In other words, the description of various functional blocks is intended to give a clear understanding of various functions performed in a device and is not to be construed as indicating that these functional blocks have to be implemented as separate physical units. For example, one or more functional blocks may be implemented by programming a processor like a single digital signal processor or a multi purpose processor accordingly.

It is further to be understood that any connection which is described as being wired based in the following specification may also be implemented as a wireless communication connection and vice versa, unless noted to the contrary.

It should be noted that the drawings are provided to give an illustration of some aspects of embodiments of the present invention and are therefore to be regarded as schematic only. In particular, the elements shown in the drawings are not necessarily to scale with each other, and the placement of various elements of the drawings is chosen to provide a clear understanding of the respective embodiment and is not to be construed as necessarily being a representation of the actual relative location of the various components in implementations of the corresponding embodiments.

The features of the various embodiments described herein may be combined with each other unless specifically noted otherwise. On the other hand, describing an embodiment with a plurality of features is not to be construed as indicating that all those features are necessary for practicing the present invention, as other embodiments may comprise less features and/or alternative features.

In the following, various embodiments involving satellite-based position determination will be described. Satellite-based position determination generally involves a receiving of signals from a plurality of satellites and determining a position based on received signals. Example for satellite navigation systems which may be used for satellite-based position determination include GPS (Global Positioning System), Galileo, GLONASS, or COMPASS. While in the following mostly GPS is used as an example, it is to be understood that all these satellite navigation systems rely essentially on the same principles and the embodiments described may be used also with other satellite navigation systems than GPS.

A variant of GPS is so-called assisted GPS (aGPS) where a GPS apparatus receives so-called assistance data via a separate data connection for example a mobile phone network. Such assistance data may comprise the approximate position of the GPS apparatus. This assistance data is then used for improving the position calculation.

The acquisition of the satellite signals is governed by certain acquisition parameters like integration times or update rates which are not used for the position calculation per se, but which are used for the processing of received satellite signals in order to provide signal data which then in turn can then be used for the calculation of the position. Also the acquisition of assistance data may be governed by acquisition parameters, for example an update rate of the assistance data. Also in this case, the acquisition parameters are not involved in the position calculation itself, but determine the acquisition of assistance data which then may be used for position calculation.

Also the calculation of the position itself may involve the use of parameters, which will be referred to as calculation parameters in the following and which are distinct from the position signals obtained from the satellite network or also from position signals or data obtained from other sources. For example, in some implementations position signals may be obtained from a satellite network and further position data may be obtained from other sources, like a cellular mobile phone network, and the calculation parameters may determine the combination of the data from the two sources to calculate the position.

In some embodiments of the present invention, data indicating an environment in which a satellite-based position determining apparatus is used. Such data may for example be derived from wireless receiver using a wireless network or wireless environment, for example a cellular network receiver like a GSM receiver or a UMTS receiver. The wireless receiver may be incorporated in a mobile unit like a cellular phone or a laptop computer. Based on this data, in some embodiments acquisition parameters and/or calculation parameters are adapted. For example, the data indicating the environment may comprise a speed of the satellite-based position determining apparatus or may indicate a signal strength to be expected. In some embodiments, the data may be obtained based on received wireless signals by evaluating a signal strength variation and/or a round trip delay.

In FIG. 1, a block diagram of an apparatus according to an embodiment of the present invention is shown. The apparatus shown in FIG. 1 comprises a cellular portion 10 for receiving cellular communication signals, for example GSM signals or UMTS signals, and a GPS portion 17 for receiving GPS satellite position signals. Cellular portion 10 is an example for a wireless portion, and in other embodiments other types of wireless portions, for example a WLAN portion for receiving WLAN signals, alternatively or additionally may be used. Likewise, it should be noted that the GPS portion is merely an example of a portion to receive satellite position signals, and also circuitry for receiving other satellite position signals like signals from Galileo satellite, GLONASS satellite and/or COMPASS satellite may be additionally or alternatively provided.

Cellular portion 10 and GPS portion 17 may be integrated in a system-on-chip (SoC) or be provided in system-in-package (SiP). In other embodiments, cellular portion 10 and GPS portion 17 may be provided as separate chips or separate sets of chips.

Cellular portion 10 receives cellular communication signals via an antenna 11 at a cellular radio frequency portion 12. Cellular radio frequency portion 12 converts the received signals to a baseband frequency and may also perform a filtering and/or an amplification of the signals. This corresponds to the operation of conventional cellular radio frequency portions and will therefore not be described in further detail.

Cellular portion 10, in particular radio frequency portion 12, is clocked by a crystal oscillator 16, for example a quartz crystal oscillator. Depending on the position required, a temperature compensated crystal oscillator may be used. For example, for GSM signals usually a standard crystal oscillator is sufficient, while for receiving UMTS signals a temperature compensated crystal oscillator may be required.

Cellular radio frequency portion 12 is coupled with a cellular baseband processor 13 to exchange control signals or data signals. In particular, cellular radio frequency portion 12 forwards the signals received via antenna 11 and converted to the baseband, for example by using a mixing with a local oscillator frequency, to cellular baseband processor 13. Cellular baseband processor 13 demodulates and further processes the received signals and outputs the process signals as indicated by an arrow 116, for example outputs the signals ultimately to a loudspeaker of a mobile phone or a headset or outputs the signals to further computing circuitry, for example if the received signals are data signals not carrying voice data.

As indicated by a box 14, the baseband processing of cellular baseband processor 13 in the embodiment of FIG. 1 comprises a channel estimation and/or a velocity information. The channel estimation comprises for example evaluating a signal strength of the cellular signals received via antenna 11. A rough velocity estimation may for example be performed by evaluating how often a handover has to be performed from one cell, i.e. one base station, to an adjacent base station. Additionally or alternatively, a Doppler frequency shift of the signal received via antenna 11 may be evaluated to estimate the velocity of the apparatus.

The data obtained by the channel and/or velocity information is indicative of an environment in which the apparatus is used. For example, low signal strengths hint at an indoor use or a use in other environments where signal strengths are typically low, for example in narrow streets shielded by buildings or also outdoors for example in canyons.

Low velocities indicate a use by pedestrians or even a stationary use, whereas high velocities indicate a use in moving vehicles, for example in car navigation.

In the embodiment of FIG. 1, the channel and/or velocity estimation data is forwarded to GPS portion 17 via interfaces generally labeled 15 in FIG. 1.

GPS portion 17 receives GPS signals sent by GPS satellites via an antenna 19 at a GPS radio frequency portion 110. GPS radio frequency portion 110 may perform a radio frequency signal processing on the GPS signals, like filtering, amplifying or a down conversion to an intermediate frequency.

The processed signals are output to a first input of a mixer 118. A second input of mixer 118 is coupled with an output of a numerically controlled oscillator (NCO) 111 which outputs a signal at a carrier frequency of the GPS signals. Through the mixing performed at mixer 118, the signals are down converted to the carrier frequency.

A numerically controlled oscillator 114 also generates a clock signal corresponding to the carrier frequency. Numerically controlled oscillator 111 and numerically controlled oscillator 114 as well as possibly other components of GPS portion 17 are clocked by a temperature compensated crystal oscillator 115. Also a crystal oscillator which is not temperature compensated or a different type of oscillator may be used if the precision is sufficient for the decoding of GPS signals.

The clock signal generated by numerically controlled oscillator 114 is fed to a code generator 113 which modulates predetermined codes assigned to different satellites onto the signal. The thus modulated signal is then correlated with the output signal of mixer 118 in a correlator 112 and the correlated signal is evaluated by a processor 18 which may be a micro controller unit (MCU), a digital signal processor (DSP), a combination thereof, or any other kind of suitable processor.

The evaluation of GPS signals using a correlation as depicted in GPS portion 17 of the embodiment of FIG. 1 is per se a conventional technique for demodulating GPS signals and will therefore not be described further.

The signals processed by processor 18 are then output as indicated by an arrow 117, for example for further processing in a navigation system, a navigation program of a mobile phone or any other entity which then calculates/determines the position of the apparatus of FIG. 1 based on the data supplied by processor 18.

The generating of the position indicating data output at 117 in GPS portion 17 may be influenced/governed by a number of acquisition parameters. For example, the signal output by correlator 112 may be integrated by processor 18 or integrated in correlator 112, and the integration time may be such an acquisition parameter. The frequency of the signal output by numerically controlled oscillator 111 and/or numerically controlled oscillator 114 may be adjusted to compensate for a Doppler shift in the received signal due to motion of the apparatus shown in FIG. 1, or in another words, specific frequency bins may be selected for the acquisition, and the frequency bin used is also an example for such an acquisition parameter. A further acquisition parameter may be an update rate of the data output at 117. Furthermore, in case of so-called assisted GPS, GPS portion 17 may additionally receive assistance data, for example assistance data received from a cellular network via cellular portion 10 and interface 15, and an update rate of such assistance data may also be an example for an acquisition parameter.

Furthermore, in some embodiments the position may be calculated not only based on data output by processor 18 at 117, but additional data may be used for calculating the position, for example also the estimated velocity mentioned above, and the coupling of the data output at 117 with such an additional data may be governed by coupling parameters, for example indicating a strong or a weak coupling or a configuration of a dead reckoning filter which tightens or relaxes an allowable location space. Such acquisition parameters or coupling parameters in the embodiment of FIG. 1 may be adjusted based on the channel and/or velocity estimation data supplied via interface 15. For example, in case the channel estimation indicates low signal strength (usually, an environment indicating low signal strength for cellular signals also have a low signal strength for GPS signals) may cause a longer integration time to be used, or a high velocity determined by the velocity information may lead to the setting of higher update rates and a corresponding modification of the frequency used for acquisition, i.e. an optimized acquisition search space for detecting the satellite signals.

Figure 2:
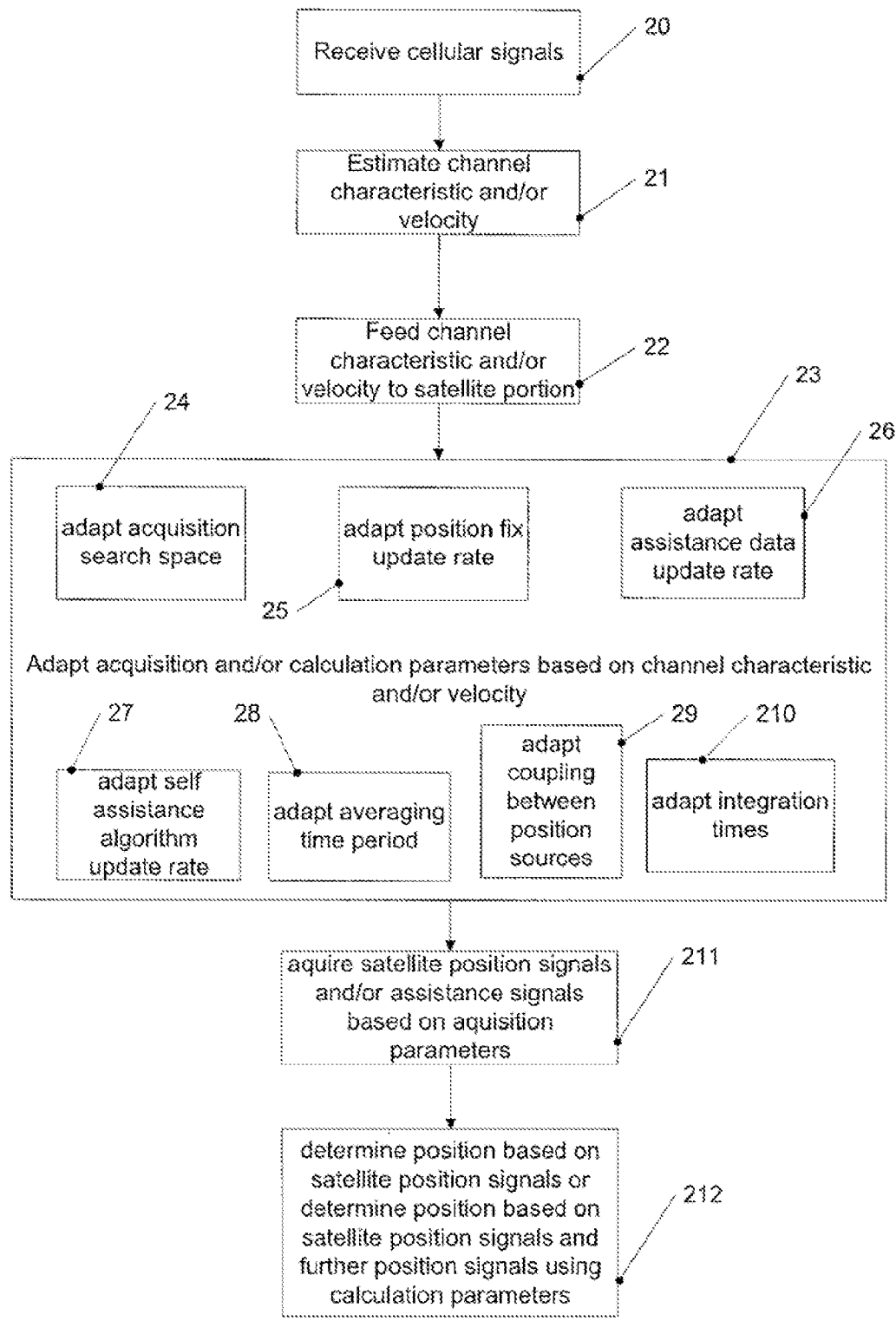
FIG. 2 shows a flow diagram of a method according to an embodiment.

In FIG. 2, a flow-diagram illustrating a method according to an embodiment is shown. The method shown in FIG. 2 may for example be implemented in the embodiment of FIG. 1, but may also be implemented independently therefrom. Moreover, while the embodiment of FIG. 2 will be described as a series of acts performed, the acts have not necessarily to be performed in the described order. In particular, some acts which are described as sequential may be performed in parallel, and various acts may be periodically repeated.

At 20, cellular signals, for example GSM signals or UMTS signals, are received. At 21, a channel characteristic and/or a velocity are estimated, for example by a baseband processor of a cellular portion as described with reference to FIG. 1. At 22, the channel characteristic and/or velocities estimated at 21 are fed to a satellite portion configured to receive satellite-based position signals, for example GPS signals.

At 24, acquisition parameters for acquiring satellite-based position signals and/or assistance data and/or calculation parameters governing for example a combination of satellite-based position signal with other position signals are adapted based on the channel characteristic and/or velocity. Some examples for such an adaptation are shown at 24 to 210. It should be noted that not all the adaptations depicted in 24 need to be implemented, but in some embodiments only one or only some of these adaptations may be implemented, and in still other embodiments other parameters than the ones shown may be adapted.

For example, at 24 an acquisition search space may be adapted based on an estimated velocity. In other words, the estimated velocity may be used to determine an estimated Doppler shift of the received satellite signals, and the received frequency used to attempt to receive satellite signals may be adapted accordingly, e.g. by selecting an appropriate frequency bin.

At 25, for example the update rate for determining the position and/or for determining the relevant satellite position signals may be updated, for example based on the estimated velocity. For higher velocities, for example typical velocity of motor vehicles, a faster update rate, for example 1 Hz, may be used, whereas for slower velocities like pedestrian velocities or stationary use, a slower update rate may be used.

Likewise, at 26 the update rate of receiving assistance data for assisted GPS or similar systems may be adapted based on the estimated velocity. An adapting of the assistance data update rate at 26 may for example save bandwidths and costs for user in case only a slow update rate is required (for example based on a low velocity estimated).

At 27, an update rate of a self-assistance algorithm may be adapted for example based on the estimated velocity, similar to the adaptation described with respect to 25 and 26. Self-assistance algorithm are used in GPS systems, in particular in case no assisted GPS is available, for example when no assistance data is available.

At 28, an averaging time period, a time period over which received signals are averaged, is adapted. For example, when low signal strengths are detected in a channel estimation, the averaging time period may be increased. In a similar manner, at 210 integration times for integrating received signals may be adapted, longer integration times for example being used for lower signal strengths and/or lower velocities.

At 29, a coupling between position sources is adapted. For example, in some instances besides the position information based on chip satellite position signals additional position information, for example based on velocity sensors in a car, based on course position information received from a cellular network or other position information may be present. The way the two kinds of position information are "mixed" to determine the final position may be determined by coupling parameters adapted at 29.

At 211, satellite position signals and/or assistance signals are acquired based on acquisition parameters, for example the acquisition parameters discussed with reference to 23.

At 212, a position is determined based either on satellite position signals alone or based on satellite position signals and further position signals, wherein in the later case, coupling parameters may be used, for example coupling parameters adapted at 29.

The above described embodiments serve only as examples, and variations and alterations are possible without departing from this scope of the application. For example, while a velocity and/or channel characteristic estimation is performed in the embodiments shown, corresponding data is indicating an environment may also be derived from other sources. For example, a velocity may be provided by a dedicated velocity/acceleration sensor, or an indoor use may be detected by a camera incorporated in a device. Furthermore, as already noted while cellular signals and corresponding cellular signals like GSM signals or UMTS signals have been used as examples, in other embodiments other types of wireless signals and corresponding receivers, for example WLAN signals and WLAN receivers, may be used.

What is claimed is:

1. An apparatus, comprising:
   a wireless portion configured to receive wireless signals over a first antenna;
   a satellite receiver portion configured to receive satellite position signals over a second antenna; and
   a processor to support execution of instructions to:
      determine an environment of the apparatus based on:
         a first determination of whether the apparatus is static or moving from the wireless signals and
         a second determination of a physical environmental context of the apparatus from the wireless signals;
      adapt an acquisition parameter and a coupling parameter based on the environment of the apparatus; and
      determine an estimate of a position or location of the apparatus based on satellite position signals acquired using the acquisition parameter and the wireless signals,
      wherein the coupling parameter is configured for processing of the satellite position signals and the wireless signals for the estimate of the position or location of the mobile device, wherein the acquisition parameter is an assistance data update rate, and wherein the assistance data is configured to be received via the wireless portion.

2. The apparatus of claim 1, wherein the wireless portion is further configured to receive cellular communication signals including a Global System for Mobile Communications (GSM) signals.

3. The apparatus of claim 1, wherein the satellite receiver portion is configured to receive satellite position signals including a signal from a Global Navigation Satellite System (GNSS).

4. The apparatus of claim 1, wherein the wireless portion is further configured to receive Universal Mobile Telecommunications System (UMTS) signals.

5. The apparatus of claim 1, wherein the wireless portion and the satellite receiver portion are integrated in a System on Chip (SoC).

6. The apparatus of claim 1, wherein the wireless portion and the satellite receiver portion are provided in a system-in-package (SiP).

7. The apparatus of claim 1, wherein the processor is a microcontroller or a digital signal processor, which supports determination of the estimate of the position or location of the mobile device, wherein the apparatus is configured to be a portion of the mobile device.

8. The apparatus of claim 1, wherein a navigation application is to determine the location of the mobile device based on the estimate of the position or location.

9. The apparatus of claim 1, wherein the second determination of the physical environmental context of the apparatus is based on signal strength of the wireless signals.

10. A mobile device, comprising:
    a first antenna;
    a wireless portion coupled to the first antenna;
    a second antenna;
    a satellite portion coupled to the second antenna;
    wherein the wireless portion is configured to receive wireless signals over the first antenna,
    wherein the satellite portion is configured to receive satellite position signals over the second antenna, and
    a processing unit, wherein the processing unit is to support execution of instructions to:
        determine an environment of the mobile device based on:
            a first determination of whether the apparatus is static or moving from the wireless signals and
            a second determination of a physical environmental context of the apparatus from the wireless signals;
        adapt an acquisition parameter and a coupling parameter based on the environment of the mobile device; and
        determine an estimate of a position or location of the mobile device based on satellite position signals acquired using the acquisition parameter and the wireless signals, wherein the coupling parameter is configured for processing of the satellite position signals and the wireless signals for the estimate of the position or location of the mobile device, wherein the acquisition parameter is an assistance data update rate, and wherein the assistance data is configured to be received via the wireless portion,
    wherein the mobile device is configured to support an application to determine a position or location of the mobile device in response to receiving the estimate of the position or location of the mobile device.

11. The mobile device of claim 10, wherein the wireless portion is further configured to receive cellular communication signals including Universal Mobile Telecommunications System (UMTS) signals.

12. The mobile device of claim 10, wherein the satellite receiver portion is configured to receive satellite position signals including a signal from a Global Navigation Satellite System (GNSS).

13. The mobile device of claim 10, wherein the wireless portion is further configured to receive Wireless Local Area Network (WLAN) signals.

14. The mobile device of claim 10, wherein the processing unit, the baseband processor, the wireless portion, and the satellite receiver portion are integrated in a System on Chip (SoC).

15. The mobile device of claim 10, wherein the processing unit, the baseband processor, the wireless portion, and the satellite receiver portion are provided in a system-in-package (SiP).

16. The mobile device of claim 10, wherein the processing unit is a microcontroller or a digital signal processor, which supports determination of the estimate of the position or location of the mobile device.

17. The mobile device of claim 10, wherein the application includes a navigation application.

18. The mobile device of claim 10, wherein the second determination of the physical environmental context of the apparatus is based on signal strength of the wireless signals.

19. A non-transitory computer readable storage medium that stores instructions for execution by one or more processors of a mobile device, comprising:
    receiving wireless signals from a wireless portion configured to receive wireless signals,
    receiving satellite position signals from a satellite portion configured to receive satellite position signals,
    determining an environment of the apparatus based on:
        a first determination of whether the apparatus is static or moving from the wireless signals and
        a second determination of a physical environmental context of the apparatus from the wireless signals;
    adapting an acquisition parameter and a coupling parameter based on the environment of the apparatus; and
    determining an estimate of a position or location of the mobile device based on satellite position signals acquired using the acquisition parameter and the wireless signals, wherein the coupling parameter is configured for processing of the satellite position signals and the wireless signals for the estimate of the position or location of the mobile device, wherein the acquisition parameter is an assistance data update rate, and wherein the assistance data is configured to be received via the wireless portion, and providing the estimate of the position or location of the mobile device for display.

20. The non-transitory computer readable storage medium of claim 19, wherein the wireless portion is further configured to receive cellular communication signals including Global System for Mobile Communications (GSM) signals.

21. The non-transitory computer readable storage medium of claim 19, wherein the satellite receiver portion is configured to receive satellite position signals including a signal from a Global Navigation Satellite System (GNSS).

22. The non-transitory computer readable storage medium of claim 19, wherein the wireless portion is further configured to receive Wireless Local Area Network (WLAN) signals.

23. The non-transitory computer readable storage medium of claim 19, further comprising:
  determining the second determination of the physical environmental context of the apparatus based on signal strength of the wireless signals.

24. The apparatus of claim 1,
  wherein the wireless signals are Wireless Local Area Network (WLAN) signals.

25. The apparatus of claim 1,
  wherein the wireless signals are Global System for Mobile Communications (GSM) signals.

26. The apparatus of claim 1,
  wherein the wireless signals are Universal Mobile Telecommunications System (UMTS) signals.

27. The apparatus of claim 1,
  wherein the wireless portion is further configured to receive Wireless Local Area Network (WLAN) signals.

28. The mobile device of claim 10,
  wherein the wireless signals are Wireless Local Area Network (WLAN) signals.

29. The mobile device of claim 10,
  wherein the wireless signals are Global System for Mobile Communications (GSM) signals.

30. The mobile device of claim 10,
  wherein the wireless signals are Universal Mobile Telecommunications System (UMTS) signals.

31. The mobile device of claim 10,
  wherein the wireless portion is further configured to receive cellular communication signals including a Global System for Mobile Communications (GSM) signals.

32. The non-transitory computer readable storage medium of claim 19,
  wherein the wireless signals are Wireless Local Area Network (WLAN) signals.

33. The non-transitory computer readable storage medium of claim 19,
  wherein the wireless signals are Global System for Mobile Communications (GSM) signals.

34. The non-transitory computer readable storage medium of claim 19,
  wherein the wireless signals are Universal Mobile Telecommunications System (UMTS) signals.

35. The non-transitory computer readable storage medium of claim 19,
  wherein the wireless portion is further configured to receive Universal Mobile Telecommunications System (UMTS) signals.

\* \* \* \* \*